(12) United States Patent
Jin et al.

(10) Patent No.: US 11,313,021 B2
(45) Date of Patent: Apr. 26, 2022

(54) HOT DIPPED MEDIUM MANGANESE STEEL AND MANUFACTURING METHOD THEREFOR

(71) Applicant: BAOSHAN IRON & STEEL CO., LTD., Shanghai (CN)

(72) Inventors: Xinyan Jin, Shanghai (CN); Yulong Zhang, Shanghai (CN); Guangkui Hu, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 228 days.

(21) Appl. No.: 16/616,118

(22) PCT Filed: Apr. 20, 2018

(86) PCT No.: PCT/CN2018/083848
§ 371 (c)(1),
(2) Date: Nov. 22, 2019

(87) PCT Pub. No.: WO2018/214682
PCT Pub. Date: Nov. 29, 2018

(65) Prior Publication Data
US 2020/0157671 A1     May 21, 2020

(30) Foreign Application Priority Data
May 26, 2017   (CN) .......................... 201710383392.8

(51) Int. Cl.
*C23C 2/06* (2006.01)
*C21D 1/74* (2006.01)
(Continued)

(52) U.S. Cl.
CPC .................. *C23C 2/06* (2013.01); *C21D 1/74* (2013.01); *C21D 6/005* (2013.01); *C21D 6/008* (2013.01);
(Continued)

(58) Field of Classification Search
CPC ... B32B 15/013; C21D 1/74; C21D 2211/001; C21D 2211/005; C21D 6/005;
(Continued)

(56) References Cited

U.S. PATENT DOCUMENTS

2016/0194739 A1   7/2016   Del Frate et al.
2017/0137909 A1   5/2017   Xu et al.

FOREIGN PATENT DOCUMENTS

CN         101346480              1/2009
CN         104328360 A     *      2/2015
(Continued)

OTHER PUBLICATIONS

Office Action dated Jan. 22, 2021 for Korean Patent Application No. 20197035799.
(Continued)

*Primary Examiner* — Jenny R Wu
(74) *Attorney, Agent, or Firm* — Lei Fang; Smith Tempel Blaha LLC (57) ABSTRACT

A hot dipped medium manganese steel and a manufacturing method therefor. The medium manganese steel comprises a steel base plate and a coating on the surface of the steel base plate; the mass percentages of the components in the hot dipped medium manganese steel are: C: 0.1 to 0.3%, Si: 0.1 to 2.0%, Mn: 5 to 12%, Al: 1 to 2%, P≤0.02%, S≤0.02%, N≤0.005%, and the remaining being Fe and unavoidable impurities; the core structure is ferrite and austenite, and the surface layer of the steel base plate is a ferrite layer.

20 Claims, 2 Drawing Sheets

(51) Int. Cl.
    *C21D 6/00*    (2006.01)
    *C21D 8/02*    (2006.01)
    *C22C 38/02*    (2006.01)
    *C22C 38/04*    (2006.01)
    *C22C 38/06*    (2006.01)

(52) U.S. Cl.
    CPC ............ *C21D 8/0273* (2013.01); *C22C 38/02* (2013.01); *C22C 38/04* (2013.01); *C22C 38/06* (2013.01); *C21D 2211/001* (2013.01); *C21D 2211/005* (2013.01)

(58) Field of Classification Search
    CPC .... C21D 6/008; C21D 8/0273; C22C 38/001; C22C 38/02; C22C 38/04; C22C 38/06; C23C 2/06
    See application file for complete search history.

(56) References Cited

FOREIGN PATENT DOCUMENTS

| | | | |
|---|---|---|---|
| CN | 105385815 A | * | 3/2016 |
| CN | 105908089 | | 8/2016 |
| CN | 106086640 | | 11/2016 |
| CN | 106319356 | | 1/2017 |
| CN | 106319356 A | * | 1/2017 |
| CN | 107299306 | | 10/2017 |
| JP | 2014019905 | | 2/2014 |
| JP | 2016508183 A | | 3/2016 |
| JP | 2016531200 A | | 10/2016 |
| JP | 2017002384 A | | 1/2017 |
| JP | 2017048412 A | | 3/2017 |
| KR | 20140083819 A | | 7/2014 |
| KR | 20160027105 | | 3/2016 |

OTHER PUBLICATIONS

International Search Report and Written Opinion dated Jul. 5, 2018 for PCT Patent Application PCT/CN2018/083848.
Office Action dated Nov. 24, 2020 for Japanese Patent Application No. 2019-565343.

* cited by examiner

HOT DIPPED MEDIUM MANGANESE STEEL AND MANUFACTURING METHOD THEREFOR

CROSS-REFERENCE TO RELATED APPLICATIONS

This application is a 371 U.S. National Phase of PCT International Application No. PCT/CN2018/083848 filed on Apr. 20, 2018, which claims benefit and priority to Chinese patent application no. 201710383392.8 filed on May 26, 2017. Both of the above-referenced applications are incorporated by reference herein in their entireties.

TECHNICAL FIELD

The present disclosure relates to the field of high-strength steel, particularly to a hot dipped medium manganese steel and a method for manufacturing the same.

BACKGROUND ART

Advanced high-strength steel is the best material that meets the requirements of automobile weight reduction and safety improvement against collision. Along with the continuous in-depth development of advanced high-strength steel by steel companies around the world, steel grades with both higher strength and higher elongation have been developed in succession.

In the advanced high-strength steel family, the Mn content in medium-manganese steel is usually 4-12%, which is lower than the high Mn content designed for TWIP steel (Mn≥15%), but higher than the Mn content designed for conventional high-strength steel (about 1-3%). The austenite content in the medium manganese steel is more than 30% at room temperature, and even more than half of it becomes the steel substrate structure, so that a sustained and significant TRIP effect is obtained during a deformation process, affording a property that the product of strength and elongation is more than 30 GPa %. Currently, medium manganese steel includes the C—Si—Mn family, the C—Mn—Al family, and the V-microalloyed C—Mn—Al—Si family, etc.

However, the surface of cold-rolled medium manganese steel is prone to rusting. Therefore, it is desirable to plate the surface of the medium manganese steel with a metal coating to avoid corrosion of the steel material. The most typical coating is a hot-dip galvanized coating. However, medium manganese steel has a higher Mn content than conventional advanced high-strength steel, which makes its hot-dip galvanizing a challenge. The reason is that, when strip steel is annealed in a reducing atmosphere, although the atmosphere is reductive to Fe, it is oxidative to elements such as Mn, Si, and Al, so that these alloying elements will be enriched in the surface of the strip steel during the annealing of the strip steel and form an oxide film that affects the wettability of the zinc liquid, resulting in skip plating or poor adhesion of the coating.

In order to eliminate the adverse influence of the surface enrichment of the alloying elements on the wettability of the zinc liquid to the advanced high-strength steel, the solutions revealed to date mainly include improving composition design, controlling annealing atmosphere, pre-plating metal before annealing, and pickling before immersion in a plating bath.

To improve composition design, in addition to minimizing the contents of harmful elements, it is also possible to introduce one or more additional elements to change the surface enrichment state of Mn. The additional elements in the prior art include Sb, Sn, and the like.

As another method to improve the platability of advanced high-strength steel, control of annealing atmosphere mainly includes controlling the dew point of the annealing atmosphere, adjusting the contents of $H_2$ and $H_2O$ in the annealing atmosphere, etc. When the contents of the Mn and Si elements are low, adjustment of the above parameters may improve the platability to some extent, but the effect is not obvious for medium manganese steel and high manganese steel with high Mn contents.

For example, Chinese Patent Publication No. CN101506403B, entitled "a method for coating a hot- or cold-rolled steel strip containing 6-30% by weight of Mn with a metallic protective layer", discloses a process for coating a hot- or cold-rolled steel strip with a metallic protective layer. This method is characterized in that, in order to produce a metallic protective layer substantially free of oxidic sub-layers on the steel strip, the % $H_2O$/% $H_2$ ratio of the water content % $H_2O$ to the hydrogen content % $H_2$ in the annealing atmosphere is adjusted as a function of the respective annealing temperature $T_G$ as follows: % $H_2O$/% $H_2 \leq 8 \cdot 10^{-15} \cdot T_G^{3.529}$. In fact, in order to satisfy the above relationship, the $H_2$ content must be very high (such as 50% or even 100%), whereas the $H_2$ content in a heating furnace on a conventional hot-dip galvanizing line is usually only 1-10%.

For another example, Chinese Patent Publication No. CN102421928B, entitled "a method for hot-dip coating of a flat steel product containing 2-35 wt. % of Mn, and a flat steel product", discloses a method for hot-dip coating of a flat steel product containing 2-35 wt % Mn with zinc or zinc alloy. The annealing atmosphere employed in this method contains 0.01-85 vol. % of $H_2$, $H_2O$ and the remainder $N_2$ and unavoidable impurities present for technical reasons and has a dew point lying between −70° C. and +60° C., wherein the $H_2O$/$H_2$ ratio satisfies: $8 \cdot 10^{-15} \cdot T_G^{3.529} \leq H_2O/H_2 \leq 0.957$, resulting in a 20-400 nm thick layer of Mn mixed oxide on the flat steel product, wherein the layer covers the flat steel product at least in sections. Although the atmosphere in a conventional heating furnace on a hot-dip galvanizing line can satisfy the above relationship easily, the effect of improving galvanizing is very limited when the surface of the strip steel has a Mn mixed oxide layer of 20-400 nm.

Pre-plating is still another method to improve the platability of high-strength steel. By pre-plating a steel plate surface with Fe, Cu, Ni, Al and other metals before annealing, formation of oxides of Si, Mn and the like at the interface between the steel substrate and the pre-coating is controlled during the annealing process, such that their enrichment in the surface is avoided.

For example, Chinese Patent Publication No. CN100577843C is entitled "a method for steel strip coating and a steel strip provided with said coating", wherein the steel strip comprises Mn: 6-30% by weight, wherein the method is characterized in that an aluminum layer is applied to the steel strip prior to final annealing, and after the final annealing, the coating is applied to the aluminum layer. The key step of this method is to coat a layer of aluminum on the surface of the medium manganese steel (optionally by a PVD method, the thickness of the aluminum layer being 50-1000 nm) before annealing, which can inhibit external oxidation of Mn. The shortcoming of this pre-plating method is that the efficiency is very low, and it is difficult to meet the requirement of industrial continuous production. Moreover, the hardware investment of the pre-plating facility will be very high.

The pickling method mainly relies on acid washing to wash away the elements enriched in the surface of strip steel during annealing, thereby eliminating the adverse influence of the surface oxides on galvanizing.

For example, Chinese Patent Publication No. CN101730752B, entitled "a method for hot dip galvanizing of AHSS or UHSS strip material, and such material obtained therefrom", discloses a method for hot dip galvanizing of dual phase steel, transformation induced plasticity steel, transformation induced plasticity assisted dual phase steel or twinning induced plasticity steel strip material, characterized in that the strip material is pickled and thereafter heated to a temperature below the continuous annealing temperature before the strip material is hot dip galvanized, wherein the temperature below the continuous annealing temperature is between 400 and 600° C., wherein the Fe in the strip material is reduced during or after the heating to a temperature below the continuous annealing temperature and before the hot dip galvanizing, and wherein an excess amount of $O_2$ is provided in the atmosphere during or after the heating of the strip material and before the reduction of the strip material.

For another example, Chinese Patent Publication No. CN101952474B, entitled "a method for coating a 6-30 wt. % Mn-containing hot-rolled or cold-rolled flat steel product with a metallic protective layer", discloses a method for coating a 6-30 wt. % Mn-containing hot-rolled or cold-rolled flat steel product with a metallic protective layer. This method is mainly characterized in that the steel flat product is subjected to a pickling treatment before entering the hot-dip melt bath, in which the steel flat product is exposed to at least two pickling baths, so that manganese oxide adhering to the steel flat product is removed. The pickled steel flat product needs to be dried before entering the melt bath to prevent the pickling liquid from entering the hot-dip coating facility. Meanwhile, the steel flat product needs to be reheated to a bath-entry temperature. In order to prevent oxide formation occurring again which impairs the coating result, before entering the melt bath, the surface temperature of the steel flat product should be controlled to not exceed 700° C. during the heating.

However, a conventional hot-dip galvanizing unit is usually arranged as heating, soaking, cooling, hot dipping, and re-cooling. The methods of the above two patents both involve first cooling a soaked steel strip to a pickling temperature (usually at least below 100° C.), then pickling, and then reheating to a bath-entry temperature for hot dipping. With the addition of the pickling stage, reheating stage and necessary temperature holding stages, the industrial production line will be very long, and the equipment cost will be very high.

Medium manganese steel has gained great attention in the steel industry and the automotive industry due to its excellent property of high strength and high elongation. Hot dipped medium manganese steel is promising in its widespread applications in the future. As such, for promoting the industrial application of medium manganese steel and weight reduction of automobiles, it is of great significance to provide a hot dipped medium manganese steel and a method for producing the same in an economical way, by which the platability problem of medium manganese steel can be solved, and hot dipped medium manganese steel having excellent coating surface quality and excellent coating adhesion can be obtained.

SUMMARY

An object of the present disclosure is to provide a hot dipped medium manganese steel and a method for manufacturing the same, wherein the hot dipped medium manganese steel has the advantages of excellent coating surface quality, good coating adhesion and excellent corrosion resistance.

To achieve the above object, the technical solution of the present disclosure is as follows:

A hot dipped medium manganese steel, comprising a steel substrate and a coating on a surface of the steel substrate, wherein the hot dipped medium manganese steel comprises C: 0.1 to 0.3%, Si: 0.1 to 2.0%, Mn: 5 to 12%, Al: 1 to 2%, P≤0.02%, S≤0.02%, N≤0.005% and a balance Fe and unavoidable impurities based on mass; wherein the steel substrate has a core structure of ferrite and austenite; and wherein the steel substrate has a skin layer which is a ferrite layer.

The various chemical elements in the above hot dipped medium manganese steel are designed according the following principle:

C: It is a typical solid solution strengthening element in steel, and it can also improve the stability of austenite, which is beneficial to retain a certain volume fraction of residual austenite at room temperature, thereby producing a transformation induced plasticity (TRIP) effect. When the content of the C element is less than 0.1%, the strength of the steel is low; and when the content of the C element is higher than 0.3%, the performances of the steel are deteriorated, which is particularly disadvantageous for the welding property of the steel material. For this reason, the C content in the steel plate according to the present disclosure needs to be limited to 0.1% to 0.3%.

Si: It is an essential element for deoxidation in steelmaking. Si not only has a certain solid solution strengthening effect, but also has the effect of inhibiting precipitation of carbides. Once the Si content is less than 0.1%, it is difficult to yield a sufficient deoxidation effect in the steel. However, if the Si content is too high, the overall performances of the steel will be affected. In addition, an appropriate amount of Si can also act to prevent cementite precipitation, thereby improving the stability of austenite during cooling. In view of this, it is necessary to control the Si content in the steel plate to be 0.1% to 2%, preferably 0.3% to 1.5%.

Mn: It is an effective austenite stabilizing element. In a medium manganese steel, the effect of Mn is similar to that of C, which can effectively improve the stacking fault energy of the material, lower the martensite transformation temperature Ms, and improve the austenite stability. In addition, unlike the effect of Mn in ordinary carbon steel, in the medium manganese steel, an increased Mn content leads to a decreased material strength. Hence, provided that the stability of the austenite in the material is guaranteed, it is necessary to minimize the Mn content. Therefore, the mass percentage of the Mn element is limited to 5-12% according to the present disclosure.

Al: It can effectively improve the resistance of the material to delayed cracking. Nevertheless, the addition of Al may significantly deteriorate the smelting and continuous casting properties of a steel material, which may easily lead to nozzle clogging during continuous casting. Moreover, in the smelting and continuous casting process, formation of a large amount of $Al_2O_3$ will reduce the flowability of molten steel, causing problems such as slag entrapment, slab cracking, etc. Therefore, the mass percentage of the Al element is limited to 1-2% according to the present disclosure.

The main impurity elements in the steel plate according to the present disclosure are P, S and N. It's better to control these impurity elements to be less, because the steel plate thus obtained will be purer. However, depending on the actual level of the smelting technology employed in a production process, if the impurity elements are controlled at a lower level, the manufacturing cost will be higher. With an overall consideration of the purity index of the steel material and the manufacturing cost to be controlled, the impurity elements P, S and N are set to be P≤0.02%, S≤0.02%, and N≤0.005% respectively.

The skin layer of the steel substrate according to the present disclosure is a ferrite layer which can allow the hot dipped medium manganese steel according to the present disclosure to have excellent platability and coating adhesion.

The Mn element in a medium manganese steel forms a surface layer with MnO enriched severely during the annealing process before hot dipping. This layer with MnO enriched affects the platability of the steel plate (i.e., poor surface quality of the coating) and the adhesion of the coating (i.e., the bonding force between the coating and the steel substrate is poor, and the coating tends to fall off easily).

In order to solve the above-mentioned two problems of the hot dipped medium manganese steel, a ferrite layer is provided on the steel substrate having a higher Mn content as a surface layer according to the present disclosure. As the Mn content in the ferrite layer is much lower than the Mn content in the steel substrate, formation of a MnO-rich layer on the surface of the ferrite layer during the annealing process before hot dipping is avoided. As a result, it's equivalent to conducting the hot dipping on the surface of ordinary ferritic steel, so that both the platability (surface quality) and coating adhesion (bonding force) of the steel plate are improved greatly.

Further, in the hot dipped medium manganese steel according to the present disclosure, the ferrite layer has a thickness of 0.2 to 5 μm.

In the hot dipped medium manganese steel according to the present disclosure, when the thickness of the ferrite layer is ≤0.2 μm, the external oxidation of the Mn and Al elements cannot be effectively suppressed, and when the thickness is ≥5 μm, a longer annealing hold time is required. Therefore, the thickness of the ferrite layer on the surface of the steel substrate is controlled to be 0.2 to 5 μm according to the present disclosure.

Further, when the grain size of the ferrite layer is ≥5 μm, the ferrite layer will be unduly thick. Hence, the grain size of the ferrite layer of the present disclosure is controlled to be ≤5 μm.

Further, the Mn content in the ferrite layer is lower than the Mn content in the steel substrate. The reason is that, under the conditions of a primary annealing process, Mn in the skin layer of the steel substrate diffuses into the surface of the steel substrate, such that the skin layer of the steel substrate develops into a manganese-lean layer. Usually, the Mn content in the ferrite layer is ≤5%. Preferably, the Mn content in the ferrite layer is controlled to be ≤2%.

Further, the Al content in the ferrite layer is higher than the Al content in the steel substrate. The reason is that, under the conditions of the primary annealing process, a part of Al in the steel substrate diffuses into the skin layer of the steel substrate, resulting in an increased Al content in the skin layer of the steel substrate. When the Al content in the steel substrate is 1-2%, preferably, the Al content in the ferrite layer is >1%, and the Al content is <5%.

In the hot dipped medium manganese steel according to the present disclosure, the ferrite layer has a C content lower than the C content in the steel substrate. The reason is that, under the conditions of the primary annealing process, the skin layer of the steel substrate undergoes decarburization reaction, thereby forming a decarburized skin layer. Preferably, the C content in the ferrite layer is ≤0.1%.

The microstructure of the core of the steel substrate is consisting of ferrite and austenite. The hot dipped medium manganese steel according to the present disclosure has a yield strength of 700-1000 MPa, a tensile strength of 950-1350 MPa, and an elongation at break of >25%.

A method for manufacturing the hot dipped medium manganese steel according to the present disclosure, comprising the following steps:

(1) Manufacturing a strip steel
(2) Primary annealing and pickling
(3) Secondary annealing and hot dipping.

The primary annealing and pickling in step (2) are performed on a continuous annealing production line. The strip steel is heated on the continuous annealing production line to a soaking temperature of 600 to 750° C. for a soaking time of 30 to 600 s, wherein the annealing atmosphere is a mixed gas of $N_2$ and $H_2$, the $H_2$ content is 0.5-10% by volume, and the dew point is −20 to +20° C. The annealed strip steel is cooled to below 100° C., and pickled with an acid solution having a hydrogen ion concentration of 0.1-5%, wherein the temperature of the acid solution is 50-70° C., and the pickling time is 1 to 10 s. Then, the strip steel is rinsed, dried and coiled.

The secondary annealing and hot dipping in step (3) are performed on the continuous hot dipping production line. The strip steel obtained in step (2) is subjected to the secondary annealing and accomplishes the hot dipping on the hot dipping production line. In the secondary annealing, the soaking temperature is 600-850° C., the soaking time is 60-360 s, and the annealing atmosphere is a mixed gas of $N_2$ and $H_2$, wherein the $H_2$ content is 2-10% by volume, and the dew point is −60 to +10° C. Subsequently, the strip steel is cooled to 380 to 500° C., and then immersed in a plating bath to perform the hot dipping.

According to the present disclosure, the soaking temperature and time, and the dew point of the annealing atmosphere in the primary annealing are controlled, so that a manganese oxide layer is formed on the surface from the Mn element, and a manganese-lean, decarburized ferrite layer is formed as the skin layer of the steel substrate. Afterwards, a pickling process is used to wash away the manganese oxide layer on the surface of the steel plate that has been annealed in the primary annealing process, and the ferrite skin layer of the steel substrate is retained. In the secondary annealing, good platability is obtained by taking the advantage of the ferrite layer of the steel substrate.

The soaking temperature in step (2) is limited to 600-750° C. for the reason that, if the soaking temperature is lower than 600° C., the amount of the Mn element enriched in the surface of the steel substrate is too limited to form a manganese-lean layer in the skin layer of the steel substrate or a ferrite layer; if the soaking temperature is higher than 750° C., the Mn element forms a large amount of oxide in the ferrite layer, thereby deteriorating the formability of the ferrite skin layer. Further preferably, the soaking temperature in step (2) is 650 to 700° C.

Further, in step (2), the dew point of the annealing atmosphere is limited to −20° C. to +20° C. The reason is that the annealing atmosphere is reductive to Fe but oxidative to Mn in the above range of the dew point of the annealing atmosphere. If the dew point is lower than −20° C., the thickness of the ferrite skin layer of the steel substrate will be ≤0.2 μm. If the dew point is higher than +20° C., a large amount of internal oxidized particles of Mn will form in the ferrite in the skin layer of the steel substrate, thereby affecting the performance of the skin layer. Preferably, the annealing atmosphere has a dew point of −10° C. to +10° C.

Preferably, in order to achieve a better implementation effect, the soaking time in step (2) is limited to 30-600 s. Further preferably, the soaking time in step (2) is 30 to 180 s.

In order to achieve a better implementation effect, the annealing atmosphere in step (2) is a mixed gas of $N_2$ and $H_2$, wherein the content of $H_2$ is 0.5-10% by volume.

In the present technical solution, the principle for controlling the acid solution concentration, temperature and time in step (2) is to wash away the manganese oxide layer on the surface and retain the ferrite skin layer. Therefore, an unduly high acid solution concentration, an unduly high acid solution temperature and an unduly long acid solution retention time will all result in washing away of the ferrite skin layer. If the manganese oxide formed during the annealing process is too thick and the pickling is insufficient, the residual oxide layer is also disadvantageous for the hot dipping in step (3). Therefore, the acid solution concentration ranges from 0.1% to 5%, the pickling temperature is from 50 to 70° C., and the pickling time is from 1 to 10 s.

The secondary annealing and hot dipping in step (3) are performed on the continuous hot dipping galvanizing production line. The strip steel obtained in step (2) is subjected to the secondary annealing and accomplishes the hot dipping on the hot dipping production line. In the secondary annealing, the soaking temperature is 600-850° C., the soaking time is 60-360 s, and the annealing atmosphere is a mixed gas of $N_2$ and $H_2$, wherein the $H_2$ content is 2-10% by volume, and the dew point is −60 to +10° C. Subsequently, the strip steel is cooled to 380 to 500° C., and then immersed in a plating bath to perform the hot dipping.

In the technical solution of the present disclosure, the annealing process parameters in step (3) may be selected within wide ranges, and it's not necessary to control the annealing atmosphere particularly. A conventional annealing atmosphere may be used to obtain the same platability as an ordinary ferrite material. The reason is that a ferrite layer of 0.2-5 μm already exists in the skin layer of the steel plate obtained in step (2). An annealing temperature, a hold time and a dew point of the annealing atmosphere that are usually used are used in the secondary annealing process. The content of the Mn element in the ferrite layer is low, and the Mn element in the steel substrate cannot surpass the ferrite layer and form a manganese oxide layer on the surface and the manganese element in the steel substrate only undergoes a small amount of internal oxidation in the ferrite layer. In other words, the surface state of the steel plate treated by step (2) is equivalent to the surface state of ordinary mild steel, so that poor platability will not be resulted in wide ranges of process parameters.

Preferably, the annealing temperature in step (3) may be selected from 600 to 850° C.; the hold time is 60 to 360 s; the annealing atmosphere comprises $H_2$ in an amount of 2 to 10%; and the annealing atmosphere has a dew point of −60 to +10° C.

Further, in step (3), the plating bath comprises, based on mass percentage, 0.1≤Al≤6%, 0<Mg≤5%, and a balance of Zn and other unavoidable impurities.

In step (3), the purpose of adding 0.1-6% of Al in the plating bath is that, when the strip steel is immersed in a zinc pot, Al in the plating bath first reacts with the strip steel to form a barrier layer, thereby suppressing the diffusion between Zn and Fe to avoid formation of a zinc-iron alloy phase which adversely affects the forming property of the coating. The addition of Mg to the plating bath is advantageous for further improving the corrosion resistance of the coating. However, if the Mg content exceeds 5%, surface oxidation will be promoted, which is disadvantageous for production. Therefore, Mg is limited to 0 to 5% according to the present disclosure. Moreover, if the contents of Al and Mg are too high, the hardness of the coating will be increased, leading to deterioration of the forming property of the coating.

Preferably, in order to achieve a better implementation effect, the temperature of the strip steel at the time of entering the zinc pot is 0-10° C. higher than the plating bath temperature.

Preferably, the plating bath temperature is 420-480° C.

The beneficial effects of the invention include:

(1) By forming a ferrite layer on the surface of the strip steel, the poor platability problem of the medium manganese steel is solved, and good platability of the medium manganese steel and good coating adhesion are achieved, thereby improving the corrosion resistance of the medium manganese steel.

(2) The method for manufacturing the hot dipped medium manganese steel according to the present disclosure can be implemented on existing continuous annealing and continuous hot dipping production lines without noticeable retrofit, and has a promising prospect of promotion and application.

DETAILED DESCRIPTION

The hot dipped medium manganese steel and the manufacture method thereof according to the present disclosure will be further explained and illustrated with reference to the accompanying drawings and the examples. Nonetheless, the explanation and illustration are not intended to unduly limit the technical solution of the present disclosure.

Figure 1:
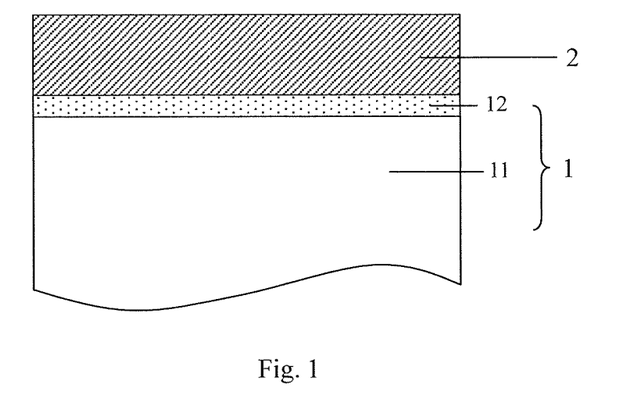
FIG. 1 is a schematic view showing a structure of a hot dipped medium manganese steel according to the present disclosure.

FIG. 1 shows the structure of the hot dipped medium manganese steel according to the present disclosure. As shown in FIG. 1, the hot dipped medium manganese steel according to the present disclosure comprises a steel substrate 1 and a coating 2 on the surface of the steel substrate 1, wherein 11 represents a core structure of the steel substrate, and 12 represents a skin layer of the steel substrate—a ferrite layer.

Figure 2:
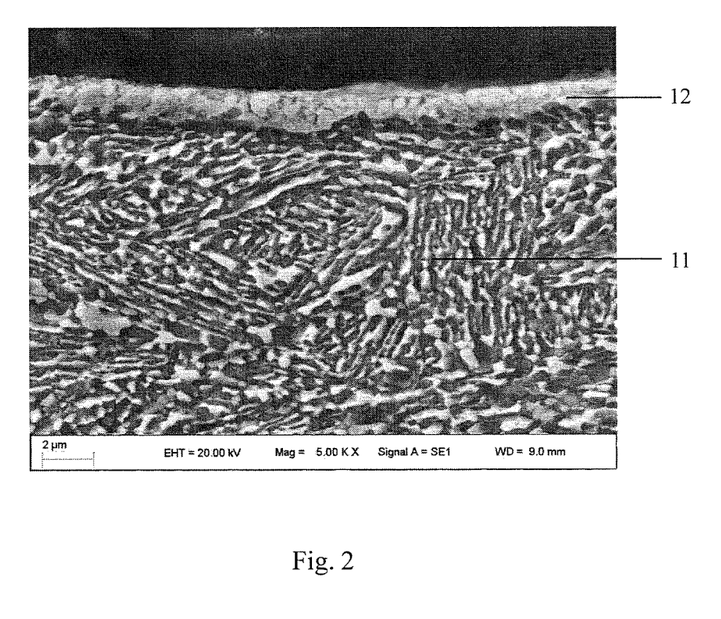
FIG. 2 shows a structure of the hot dipped medium manganese steel according to the present disclosure before the hot dipping.

FIG. 2 shows a structure of the hot dipped medium manganese steel according to the present disclosure before the hot dipping. As shown in FIG. 2, the core structure 11 of the steel substrate is austenite+ferrite, and the skin layer 12 of the steel substrate is a ferrite layer.

Figure 3:
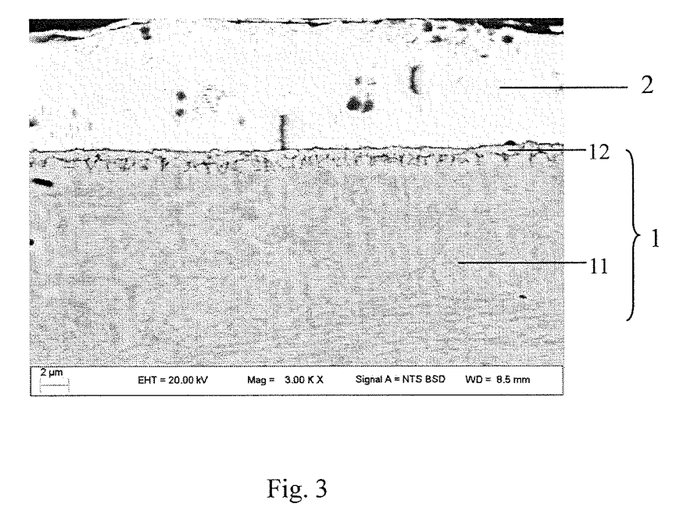
FIG. 3 is a metallographical photograph showing a cross section of Example 1 according to the present disclosure.

FIG. 3 shows the metallography of the cross section of Example 1 according to the present disclosure. As shown in FIG. 3, 11 represents the core portion of the steel substrate 1; 12 represents the ferrite layer; and 2 represents the coating.

The present inventors conducted detailed studies on the process parameters in steps (2) and (3) in the method for manufacturing the hot dipped medium manganese steel according to the present disclosure.

Table 1 lists mass percentages of the chemical components in the hot dipped medium manganese steels of Examples 1 to 20 and the conventional steel plates of Comparative Examples 1-12. The balance is Fe and unavoidable impurities.

As can be seen from Table 1, the mass percentage contents of the chemical components in Compositions I, II and III are controlled in the ranges of C: 0.1 to 0.3%, Si: 0.1 to 2.0%, Mn: 5 to 12%, and Al: 1-2%, P≤0.02%, S≤0.02%, N≤0.005%. The Mn content in Composition IV is outside the above range.

TABLE 1

(unit: wt %)

|   | C | Mn | Al | Si | N | P | S |
|---|---|---|---|---|---|---|---|
| I | 0.2 | 7.2 | 1.5 | 0.19 | 0.02 | 0.008 | 0.007 |
| II | 0.2 | 10.1 | 1.6 | 0.54 | 0.03 | 0.017 | 0.005 |
| III | 0.2 | 12.0 | 1.2 | 0.13 | 0.018 | 0.015 | 0.01 |
| IV | 0.18 | 2.0 | 1.0 | 0.2 | 0.011 | 0.008 | 0.01 |

The following steps are employed for the hot dipped medium manganese steels in Examples 1-20:

(1) Manufacturing a strip steel;

(2) Primary annealing and pickling: The strip steel was heated on a continuous annealing production line to a soaking temperature of 600 to 750° C. for a soaking time of 30 to 600 s, wherein the annealing atmosphere was a mixed gas of $N_2$ and $H_2$, the $H_2$ content was 0.5-10% by volume, and the dew point was −20 to +20° C.; the annealed strip steel was cooled to below 100° C., and pickled with an acid solution having a hydrogen ion concentration of 0.1-5%, wherein the temperature of the acid solution was 50-70° C., and the pickling time was 1 to 10 s; then, the strip steel was rinsed, dried and coiled;

(3) Secondary annealing and hot dipping: the strip steel obtained in step (2) was subjected to secondary annealing and accomplished hot dipping on a hot dipping production line, wherein the soaking temperature in the secondary annealing was 600-850° C., the soaking time was 60-360 s, and the annealing atmosphere was a mixed gas of $N_2$ and $H_2$, wherein the $H_2$ content was 2-10% by volume, and the dew point was −60 to +10° C.; subsequently, the strip steel was cooled to 380 to 500° C., and then immersed in a plating bath to perform the hot dipping.

Table 2 lists the specific process parameters for the hot dipped medium manganese steels of Examples 1 to 20 and the conventional steel plates of Comparative Examples 1-12.

Figure 4:
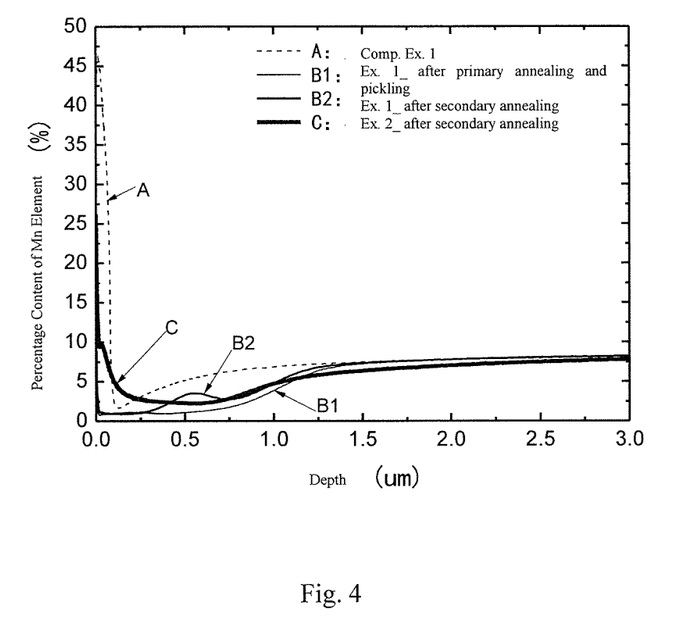
FIG. 4 shows distribution curves of the surface Mn element as a function of depth for Example 1 after the primary annealing and pickling and after the secondary annealing, Example 2 after the secondary annealing, and Comparative Example 1 after the primary annealing.

FIG. 4 shows distribution curves of the surface Mn element as a function of depth for Example 1 after the primary annealing and pickling (B1), after the secondary annealing (B2), for Example 2 after the secondary annealing (C), and for Comparative Example 1 after the primary annealing (A).

Among them, A corresponds to an annealed steel plate obtained in Comparative Example 1 wherein the primary annealing temperature was 700° C., the soaking time was 120 s, and the dew point of the annealing atmosphere was −40° C. Mn was obviously enriched in its surface, and a manganese-lean layer was not obvious on the subsurface. When the annealed steel plate with such a surface state was subjected to hot dipping, the platability was poor.

B1 corresponds to a steel plate obtained in Example 1 wherein the annealing temperature was 650° C., the hold time was 100 s, the dew point of the annealing atmosphere was 0° C., and the steel plate was pickled. The manganese oxide on the surface was removed by the pickling, and a manganese-lean layer having a thickness of about 1 μm was present on the subsurface.

B2 is the Mn element distribution as a function of depth in the surface of a strip steel obtained from the pickled B1 strip steel in Example 1 by performing step (3) wherein the pickled B1 strip steel was subjected to secondary annealing at a secondary annealing temperature of 650° C. for a hold time of 120 s in an annealing atmosphere having a dew point of −10° C. A small amount of Mn was enriched in the surface of the B2 strip steel, but much lower than that in Comparative Example A. When this strip steel with such a surface state was subjected to hot dipping, the platability was good.

C is the Mn element distribution as a function of depth in the surface of the strip steel of Example 2 after two annealing treatments in steps (2) and (3), wherein in the primary annealing of step (2), the annealing temperature was 650° C., the hold time was 120 s, and the dew point of the annealing atmosphere was 0° C.; while in the secondary annealing of step (3), the annealing temperature was 800° C., the hold time was 90 s, and the dew point of the annealing atmosphere was −50° C. Since the secondary annealing temperature in Example 2 was higher than the secondary annealing temperature in Example 1, and the dew point of secondary annealing atmosphere in Example 2 was lower than the dew point of the secondary annealing atmosphere in Example 1, the surface enrichment of the Mn element in Example 2 was more obvious than that in Example 1, but still less obvious than that in Comparative Example 1. When the strip steel with the surface state of Example 2 was subjected to hot dipping, the plateability was still good.

Table 3 lists the various property parameters and structural features of the hot dipped medium manganese steel plates of Examples 1 to 20 and the conventional steel plates of Comparative Examples 1-12.

The platability was judged by directly observing the appearance of the strip steel after plating with naked eyes. If no iron was exposed obviously on the surface, the platability was good (indicated by ○); and if iron was exposed obviously on the surface, the platability was poor (indicated by x).

The coating adhesion was tested by taking a sample having a length of 200 mm and a width of 100 mm from a strip steel, bending it to an angle of 180 degree, flattening it, and adhering an adhesive tape to the bent position. If no zinc layer was peeled off by the tape or the bent surface of the bent coating to which the tape was once adhered did not pill, it suggested that the coating adhesion was good (indicated by ○); if the coating was peeled off by the tape or the bent surface of the bent coating to which the tape was once adhered pilled, it suggested that the coating adhesion was poor (indicated by x).

As shown by Table 3, the yield strength of Examples 1-20 was 700-1000 MPa, the tensile strength was 950-1350 MPa, and the elongation at break was >25%. The thickness of the ferrite skin layer of the steel substrates of Example 1-20 was 0.2-5 μm, the grain size of the ferrite skin layer was ≤5 μm, and both the platability and the coating adhesion were superior to those of Comparative Examples 1-10.

The reason is that a ferrite layer was formed on the surface of the steel substrate in step (2) in the Examples, so that the diffusion of Mn from the steel substrate to the surface of the steel plate was suppressed in step (3). This was advantageous for the formation of an effective Fe—Al barrier layer from Al and the ferrite layer in the plating bath, thereby providing good platability and coating adhesion.

In addition, since the steel substrate composition and the manufacturing method defined by the present disclosure were not used for Comparative Examples 11-12, despite their good platability and coating adhesion, the steel plates of Comparative Examples 11-12 were not characterized by a structure in which the steel substrate core was ferrite+austenite, and the skin layer of the steel substrate was a ferrite layer. At the same time, their elongation at break was low.

It is to be noted that there are listed above only specific examples of the invention. Obviously, the invention is not limited to the above examples. Instead, there exist many similar variations. All variations derived directly or envisioned from the present disclosure by those skilled in the art should be all included in the protection scope of the present disclosure.

TABLE 2

| No. | Composition | Step 1) | | | | | | | Step 2) | | | |
|---|---|---|---|---|---|---|---|---|---|---|---|---|
| | | Soaking Temp. °C. | Soaking Time s | $H_2$ content % | Dew Point °C. | Acid Sol. Conc. % | Acid Sol. Temp. °C. | Pickling Time s | Soaking Temp. °C. | Soaking Time s | $H_2$ content % | Dew Point °C. |
| Ex. 1 | I | 650 | 100 | 4 | 0 | 3.9 | 62 | 6 | 750 | 120 | 8 | −30 |
| Ex. 2 | I | 650 | 120 | 7 | 0 | 4.8 | 50 | 4 | 800 | 90 | 9 | −50 |
| Ex. 3 | I | 700 | 260 | 8 | 8 | 3.2 | 50 | 2 | 620 | 170 | 8 | −47 |
| Ex. 4 | I | 690 | 520 | 7 | 17 | 2.5 | 69 | 9 | 770 | 200 | 4 | −43 |
| Ex. 5 | I | 600 | 230 | 7 | −10 | 0.7 | 67 | 9 | 810 | 260 | 9 | −6 |
| Ex. 6 | I | 690 | 160 | 5 | −15 | 0.8 | 57 | 8 | 840 | 180 | 8 | −50 |
| Ex. 7 | I | 660 | 140 | 8 | 8 | 4.1 | 59 | 4 | 780 | 180 | 3 | −45 |
| Ex. 8 | I | 740 | 350 | 3 | 20 | 0.6 | 64 | 9 | 600 | 80 | 3 | −29 |
| Ex. 9 | I | 620 | 130 | 3 | 18 | 2.2 | 68 | 9 | 600 | 60 | 8 | −44 |
| Ex. 10 | I | 710 | 410 | 2 | −5 | 4.4 | 64 | 8 | 810 | 80 | 9 | −22 |
| Ex. 11 | I | 600 | 210 | 2 | −5 | 2.9 | 56 | 3 | 780 | 130 | 4 | 4 |
| Ex. 12 | I | 740 | 60 | 8 | 3 | 4.7 | 55 | 5 | 720 | 290 | 8 | −1 |
| Ex. 13 | II | 730 | 310 | 6 | −13 | 1.2 | 59 | 3 | 650 | 290 | 4 | −45 |
| Ex. 14 | II | 680 | 200 | 6 | −17 | 1.3 | 50 | 7 | 600 | 290 | 3 | 8 |
| Ex. 15 | II | 680 | 150 | 4 | −20 | 4.7 | 64 | 10 | 780 | 90 | 4 | 6 |
| Ex. 16 | II | 610 | 120 | 8 | −4 | 2.8 | 59 | 10 | 830 | 280 | 9 | −24 |
| Ex. 17 | III | 630 | 130 | 1 | 5 | 1.5 | 63 | 7 | 750 | 110 | 6 | −40 |
| Ex. 18 | III | 630 | 180 | 9 | 12 | 4.8 | 67 | 8 | 620 | 210 | 10 | −53 |
| Ex. 19 | III | 710 | 470 | 9 | 18 | 4.7 | 55 | 4 | 800 | 90 | 2 | −27 |
| Ex. 20 | III | 660 | 580 | 2 | 6 | 2.4 | 61 | 1 | 710 | 110 | 7 | −27 |
| Comp. Ex. 1 | I | / | / | / | / | / | / | / | 700 | 120 | 4 | −40 |
| Comp. Ex. 2 | I | / | / | / | / | / | / | / | 670 | 340 | 7 | −22 |
| Comp. Ex. 3 | I | / | / | / | / | / | / | / | 670 | 180 | 2 | −29 |
| Comp. Ex. 4 | I | / | / | / | / | / | / | / | 700 | 80 | 3 | −11 |
| Comp. Ex. 5 | I | 660 | 230 | 8 | −30 | 0.4 | 62 | 5 | 790 | 90 | 6 | −53 |
| Comp. Ex. 6 | I | 740 | 120 | 7 | −45 | 4.4 | 67 | 1 | 740 | 330 | 4 | −47 |
| Comp. Ex. 7 | II | / | / | / | / | / | / | / | 810 | 220 | 6 | 4 |
| Comp. Ex. 8 | II | 660 | 570 | 8 | −50 | 3.4 | 57 | 10 | 680 | 300 | 6 | −38 |
| Comp. Ex. 9 | III | / | / | / | / | / | / | / | 650 | 140 | 9 | −56 |
| Comp. Ex. 10 | III | 630 | 510 | 1 | −35 | 4.7 | 57 | 3 | 600 | 120 | 9 | 1 |
| Comp. Ex. 11 | IV | / | / | / | / | / | / | / | 820 | 130 | 7 | −6 |
| Comp. Ex. 12 | IV | 620 | 240 | 10 | −15 | 2.1 | 56 | 4 | 830 | 240 | 10 | −29 |

TABLE 3

| No. | Composition | Yield Strength (MPa) | Tensile Strength (MPa) | Elongation at Break (%) | Thickness of Ferrite Layer (μm) | Grain Size of Ferrite Layer (μm) | Platability (appearance) | Coating Adhesion |
|---|---|---|---|---|---|---|---|---|
| Ex. 1 | I | 762 | 1106 | 35.0 | 1.0 | 1.0 | ○ | ○ |
| Ex. 2 | I | 872 | 1218 | 26.4 | 2.1 | 0.9 | ○ | ○ |
| Ex. 3 | I | 983 | 1243 | 30.2 | 2.7 | 1.2 | ○ | ○ |
| Ex. 4 | I | 924 | 1220 | 26.8 | 4.0 | 1.7 | ○ | ○ |
| Ex. 5 | I | 935 | 1172 | 43.9 | 2.3 | 1.9 | ○ | ○ |
| Ex. 6 | I | 837 | 1162 | 42.1 | 1.0 | 0.7 | ○ | ○ |
| Ex. 7 | I | 780 | 1057 | 41.2 | 0.5 | 0.5 | ○ | ○ |
| Ex. 8 | I | 868 | 1009 | 25.3 | 2.6 | 1.8 | ○ | ○ |
| Ex. 9 | I | 808 | 1027 | 29.1 | 1.3 | 1.2 | ○ | ○ |
| Ex. 10 | I | 889 | 1103 | 28.5 | 3.7 | 2.3 | ○ | ○ |
| Ex. 11 | I | 770 | 1163 | 27.0 | 1.2 | 0.5 | ○ | ○ |
| Ex. 12 | I | 789 | 1288 | 41.6 | 0.8 | 0.5 | ○ | ○ |
| Ex. 13 | II | 706 | 1001 | 35.5 | 3.0 | 1.9 | ○ | ○ |
| Ex. 14 | II | 937 | 1337 | 29.4 | 1.6 | 1.0 | ○ | ○ |
| Ex. 15 | II | 925 | 1319 | 35.4 | 1.2 | 1.0 | ○ | ○ |

TABLE 3-continued

| No. | Composition | Yield Strength (MPa) | Tensile Strength (MPa) | Elongation at Break (%) | Thickness of Ferrite Layer (μm) | Grain Size of Ferrite Layer (μm) | Platability (appearance) | Coating Adhesion |
|---|---|---|---|---|---|---|---|---|
| Ex. 16 | II | 871 | 1100 | 41.3 | 0.7 | 0.7 | ○ | ○ |
| Ex. 17 | III | 796 | 961 | 47.5 | 0.9 | 0.7 | ○ | ○ |
| Ex. 18 | III | 712 | 1150 | 48.7 | 1.7 | 1.1 | ○ | ○ |
| Ex. 19 | III | 760 | 987 | 41.7 | 3.6 | 2.7 | ○ | ○ |
| Ex. 20 | III | 881 | 1348 | 41.5 | 4.3 | 3.4 | ○ | ○ |
| Comp. Ex. 1 | I | 879 | 986 | 43.7 | 0 | / | x | x |
| Comp. Ex. 2 | I | 799 | 1127 | 26.2 | 0 | / | x | x |
| Comp. Ex. 3 | I | 932 | 1336 | 34.4 | 0 | / | x | x |
| Comp. Ex. 4 | I | 752 | 1056 | 38.3 | 0 | / | x | x |
| Comp. Ex. 5 | I | 833 | 1330 | 35.1 | 0 | / | x | x |
| Comp. Ex. 6 | I | 717 | 1072 | 28.7 | 0 | / | ○ | x |
| Comp. Ex. 7 | II | 948 | 1300 | 37.0 | 0 | / | x | x |
| Comp. Ex. 8 | II | 747 | 1221 | 25.1 | 0 | / | x | x |
| Comp. Ex. 9 | III | 932 | 1303 | 41.7 | 0 | / | x | x |
| Comp. Ex. 10 | III | 847 | 1029 | 42.3 | 0 | / | ○ | x |
| Comp. Ex. 11 | IV | 652 | 812 | 20.0 | 0 | / | ○ | ○ |
| Comp. Ex. 12 | IV | 647 | 825 | 23.0 | 0 | / | ○ | ○ |

What is claimed is:

1. A hot dipped medium manganese steel, comprising a steel substrate and a coating on a surface of the steel substrate, wherein the steel substrate of the hot dipped medium manganese steel comprises C: 0.1 to 0.2%, Si: 0.1 to 2.0%, Mn: 5 to 12%, Al: 1 to 2%, P≤0.02%, S≤0.02%, N≤0.005% and a balance Fe and unavoidable impurities based on mass; wherein the steel substrate has a core structure of ferrite and austenite; and wherein the steel substrate has a skin layer which is a ferrite layer, and wherein the hot dipped medium manganese steel has a yield strength of 700-1000 MPa, a tensile strength of 950-1350 MPa, and an elongation at break of at least 27%.

2. The hot dipped medium manganese steel according to claim 1, wherein the ferrite layer has a thickness of 0.2-5 μm.

3. The hot dipped medium manganese steel according to claim 1, wherein the ferrite layer has a grain size of ≤5 μm.

4. The hot dipped medium manganese steel according to claim 1, wherein the ferrite layer has a Mn content lower than that in the steel substrate.

5. The hot dipped medium manganese steel according to claim 1, wherein the ferrite layer has a Mn content of ≤5%.

6. The hot dipped medium manganese steel according to claim 5, wherein the ferrite layer has a Mn content of ≤2%.

7. The hot dipped medium manganese steel according to claim 1, wherein the ferrite layer has an Al content higher than that in the steel substrate.

8. The hot dipped medium manganese steel according to claim 1, wherein the ferrite layer has an Al content of >1%.

9. The hot dipped medium manganese steel according to claim 1, wherein the ferrite layer has an Al content of <5%.

10. The hot dipped medium manganese steel according to claim 1, wherein the ferrite layer comprises an Al oxide.

11. The hot dipped medium manganese steel according to claim 1, wherein the ferrite layer has a C content lower than that in the steel substrate.

12. The hot dipped medium manganese steel according to claim 1, wherein the ferrite layer has a C content of ≤0.1%.

13. The hot dipped medium manganese steel according to claim 1, wherein the coating has a thickness of 5-200 μm.

14. A method for manufacturing the hot dipped medium manganese steel of claim 1, comprising the following steps:
   1) Manufacturing a strip steel;
   2) Primary annealing and pickling
      wherein the strip steel is heated on a continuous annealing production line to a soaking temperature of 600 to 750° C. for a soaking time of 30 to 600 s, wherein a mixed gas of $N_2$ and $H_2$ is used as an annealing atmosphere which has a He content of 0.5-10% by volume and a dew point of −20 to +20° C.; subsequently, the strip steel is cooled to below 100° C. after the annealing, and pickled with an acid solution having a hydrogen ion concentration of 0.1-5%, wherein the acid solution has a temperature of 50-70° C., and a pickling time is 1 to 10 s; then, the strip steel is rinsed, dried and coiled;
   3) Secondary annealing and hot dipping:
      wherein the strip steel obtained in step (2) is subjected to secondary annealing and accomplishes hot dipping on a hot dipping production line, wherein the secondary annealing is performed at a soaking temperature of 600-850° C. for a soaking time of 60-360 s in an annealing atmosphere of a mixed gas of $N_2$ and $H_2$, wherein the annealing atmosphere has a $H_2$ content of 2-10% by volume, and a dew point of −60 to +10° C.; subsequently, the strip steel is cooled to 380 to 500° C., and then immersed in a plating bath to perform the hot dipping, thereby producing the hot dipped medium manganese steel of claim 1.

15. The method for manufacturing the hot dipped medium manganese steel according to claim 14, wherein the soaking temperature in step (2) is 600-700° C.

16. The method for manufacturing the hot dipped medium manganese steel according to claim 14, wherein the soaking time in step (2) is 30-180 s.

17. The method for manufacturing the hot dipped medium manganese steel according to claim 14, wherein the annealing atmosphere in step (2) has a dew point of −10 to +10° C.

18. The method for manufacturing the hot dipped medium manganese steel according to claim 14, wherein the plating bath in step (3) comprises, based on mass percentage, 0.1≤Al≤6%, 0<Mg≤5% and a balance of Zn and unavoidable impurities.

19. The method for manufacturing the hot dipped medium manganese steel according to claim 14, wherein the annealing atmosphere in step (3) has a dew point of −60 to −20° C.

20. The method for manufacturing the hot dipped medium manganese steel according to claim 14, wherein the plating bath in step (3) has a temperature of 420-480° C.

* * * * *